US009224418B2

(12) United States Patent
Scott, III

(10) Patent No.: US 9,224,418 B2
(45) Date of Patent: Dec. 29, 2015

(54) ACCESSING PROTECTED CONTENT ON AN OPTICAL DISC

(71) Applicant: MICROSOFT TECHNOLOGY LICENSING, LLC, Redmond, WA (US)

(72) Inventor: George Easton Scott, III, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/190,832

(22) Filed: Feb. 26, 2014

(65) Prior Publication Data

US 2015/0243320 A1 Aug. 27, 2015

(51) Int. Cl.
*G11B 20/18* (2006.01)
*G11B 20/00* (2006.01)

(52) U.S. Cl.
CPC .................. *G11B 20/00123* (2013.01)

(58) Field of Classification Search
CPC ............. G11B 20/00086; G11B 20/1217; G11B 20/1883; G11B 2220/20; G11B 7/00
USPC ............ 369/52.1, 53.21, 47.1, 53.16, 30.03; 235/487, 492; 428/817
See application file for complete search history.

(56) References Cited

U.S. PATENT DOCUMENTS

| | | | |
|---|---|---|---|
| 6,198,875 B1 | 3/2001 | Edenson et al. | |
| 6,636,689 B1 | 10/2003 | Stebbings | |
| 7,546,616 B2 | 6/2009 | Benedikt et al. | |
| 7,789,315 B2 * | 9/2010 | Karstens | 235/492 |
| 8,743,670 B2 * | 6/2014 | Orlando | 369/53.21 |
| 2001/0021144 A1 | 9/2001 | Oshima et al. | |
| 2003/0034400 A1 * | 2/2003 | Han et al. | 235/487 |
| 2004/0196759 A1 | 10/2004 | Ishibashi et al. | |
| 2010/0085853 A1 | 4/2010 | Kirovski et al. | |

FOREIGN PATENT DOCUMENTS

JP 2001083874 A 3/2001

OTHER PUBLICATIONS

ISA European Patent Office, International Search Report and Written Opinion Issued in PCT Application No. PCT/US2015/017000, May 26, 2015, WIPO, 9 Pages

* cited by examiner

*Primary Examiner* — Nabil Hindi
(74) *Attorney, Agent, or Firm* — Gregg Wisdom; Judy Yee; Micky Minhas

(57) ABSTRACT

Embodiments for validating an optical disc storing protected content are provided. In one example, a method comprises receiving the optical disc in an optical disc drive, detecting with a signal detector a signal while the optical disc is at rest, spinning the optical disc, determining, with the signal detector, one or more of an electrical and magnetic effect on the signal resulting from the spinning of the optical disc, and validating the optical disc if the one or more of the electrical and magnetic effect meets a predetermined condition.

19 Claims, 4 Drawing Sheets

ACCESSING PROTECTED CONTENT ON AN OPTICAL DISC

BACKGROUND

Digital information, such as computer programs, stored on optical discs, such as DVDs and CDs, may be relatively easy to produce and distribute. As such, at least some of the content stored on the optical discs may be encrypted or otherwise protected to prevent illicit distribution of the content. To access the protected content, a security tag may be embedded in the optical disc, wherein the security tag comprises information useable to access the information on the disc.

SUMMARY

Embodiments related to validating an optical disc storing protected content are provided. In one example, a method comprises receiving the optical disc in an optical disc drive, detecting with a signal detector a signal while the optical disc is at rest; spinning the optical disc, determining, with the signal detector, one or more of an electrical and magnetic effect on the signal resulting from the spinning of the optical disc, and validating the optical disc if the one or more of the electrical and magnetic effect meets a predetermined condition.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

To prevent illicit consumption and/or distribution of protected media content, optical discs, such as CDs and DVDs, may include an embedded security device. The embedded security device may utilize, for example, a RFID or near field communication chip that encodes information usable to access the protected content, such as a decryption key. To access the decryption key, a playback device configured to read the optical disc (e.g. an optical drive for a computing device) may include a sensor to detect the security device.

However, such a security device may be compromised via the use of a radiofrequency emitter, also referred to as a spoofer, to spoof the security protocol. The spoofer may emit a radiofrequency signal detectable by the sensor of the playback device and include information usable to access protected content contained on an illicitly-produced optical disc that does not include an embedded security device.

Thus, to avoid the use of a spoofer to compromise security, embodiments are disclosed herein that relate to detecting rotation of the embedded security device to ensure that a detected signal originates from the embedded security device. This may help to detect and reject spoofers not on the disc.

As a more specific example, where an optical disc includes an RFID tag, a change in a transmission frequency of the RFID tag may be detected by an RF sensor due to the Doppler effect as the RFID tag approaches, passes by, and recedes from the sensor. These shifts in frequency may act as a confirmation that the detected signal is being emitted from the optical disc, and not from a stationary spoofer. Other embodiments may use other physical phenomena to detect rotation of the security device.

Figure 1:
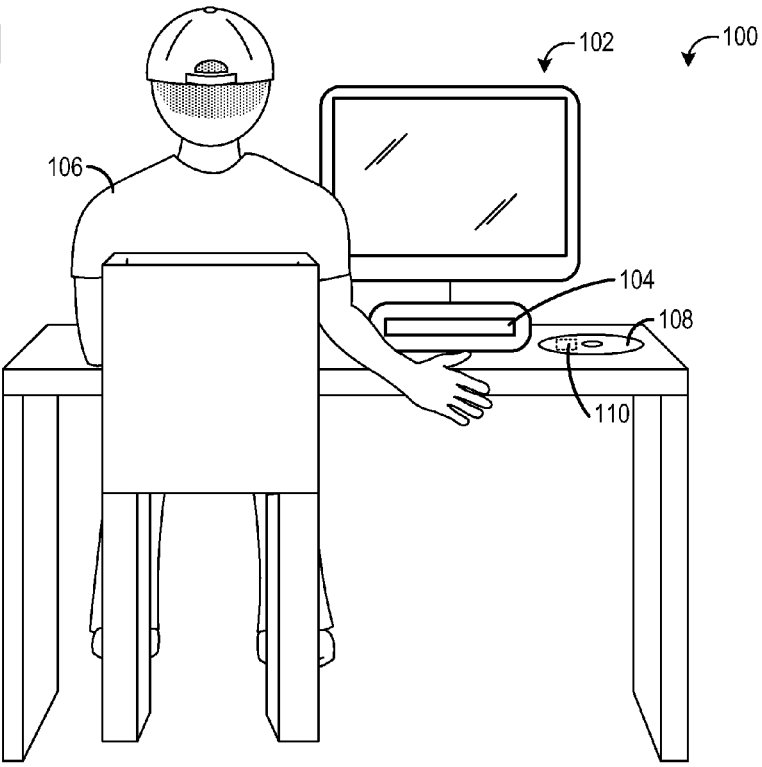
FIGS. 1-2 illustrate a media system including an optical disc having protected content according to embodiments of the present disclosure.

FIG. 1 shows a schematic diagram of a media environment 100 including a playback device configured to read an optical disc. In the example illustrated in FIG. 1, the playback device comprises a computing device 102 including an optical disc drive 104. The optical disc drive 104 may include one or more optical sensors for reading content on an optical disc, such as optical disc 108, as well as one or more additional sensors for confirming that the optical disc is a valid disc, explained in more detail below. The optical disc 108 may be any suitable disc, such as compact disc (CD), digital video disc (DVD), or other optical disc, including suitable media content, such as music, videos, pictures, software, etc., that may be utilized by the computing device 102.

The content on optical disc 108 may be protected content that may be accessible only to authorized users. To prevent non-authorized users from accessing and/or reproducing the protected content, the optical disc 108 may include a security device 110, such as a security chip, including information usable to access the protected content. For example, the security device may include a decryption key usable by the computing device 102 to decrypt at least some of the protected content. To confirm that the decryption key is a valid decryption key associated with a valid optical disc, the security device 110 may further include an identification tag, such as radiofrequency identification (RFID) tag, near field communication tag, or a magnetic tag. The optical disc drive 104 may include one or more radiofrequency sensors or magnetic sensors that may detect the radiofrequency and/or magnetic field signal emitted by the security device 110. Upon detecting the RF or magnetic signal, the security device may be confirmed as valid and the decryption key may be used to access the protected content.

FIG. 1 shows a user 106 in the process of accessing a valid optical disc, as the optical disc 108 includes an embedded valid security device 110. However, if the optical disc is not valid (e.g., produced from a source other than and without permission from the original manufacturer), a valid embedded security device may not be present in the optical disc.

Figure 2:
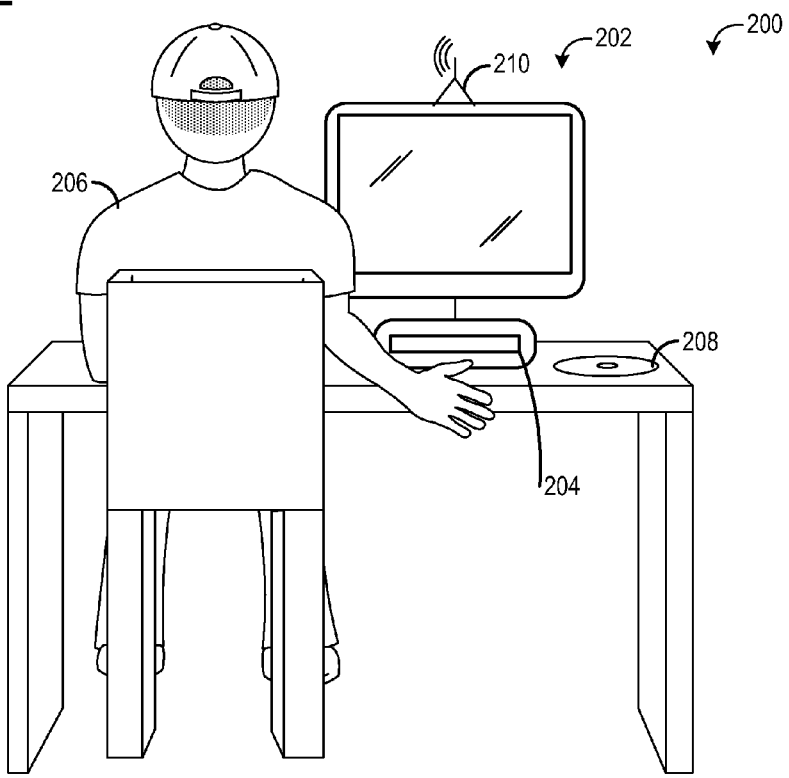

In this case, a user may be able to illicitly access the protected content via a spoofer. FIG. 2 shows another example embodiment of a media environment 200 including a computing device 202 which, similar to computing device 102 of FIG. 1, includes an optical disc drive 204 for reading an optical disc. In FIG. 2, user 206 is attempting to access protected content from an illicit optical disc 208 that does not include an embedded security device. To access the protected content, a spoofer device 210 placed close to the optical disc may be used to spoof the security protocol used to validate the optical disc. Stationary device 210 may emit a signal similar to the signal emitted by a security device embedded in a valid optical disc, and may also include a decryption key usable to decrypt the protected content. For example, the stationary device 210 may emit an RF signal that can be detected by the RF sensor of the optical disc drive 204. After the computing device 202 detects the signal received from stationary device 110, it may confirm the decryption key also emitted from the device 110 is valid and allow decryption of the protected content.

Such spoofing devices may enable use of illicitly produced copies of optical discs and circumvent the digital rights associated with the protected content on the optical discs. Thus, as described above, to prevent the use of such spoofing devices to access protected content on illicitly produced optical discs, it may be determined whether the security chip rotates synchronously with the optical disc.

Figure 3:
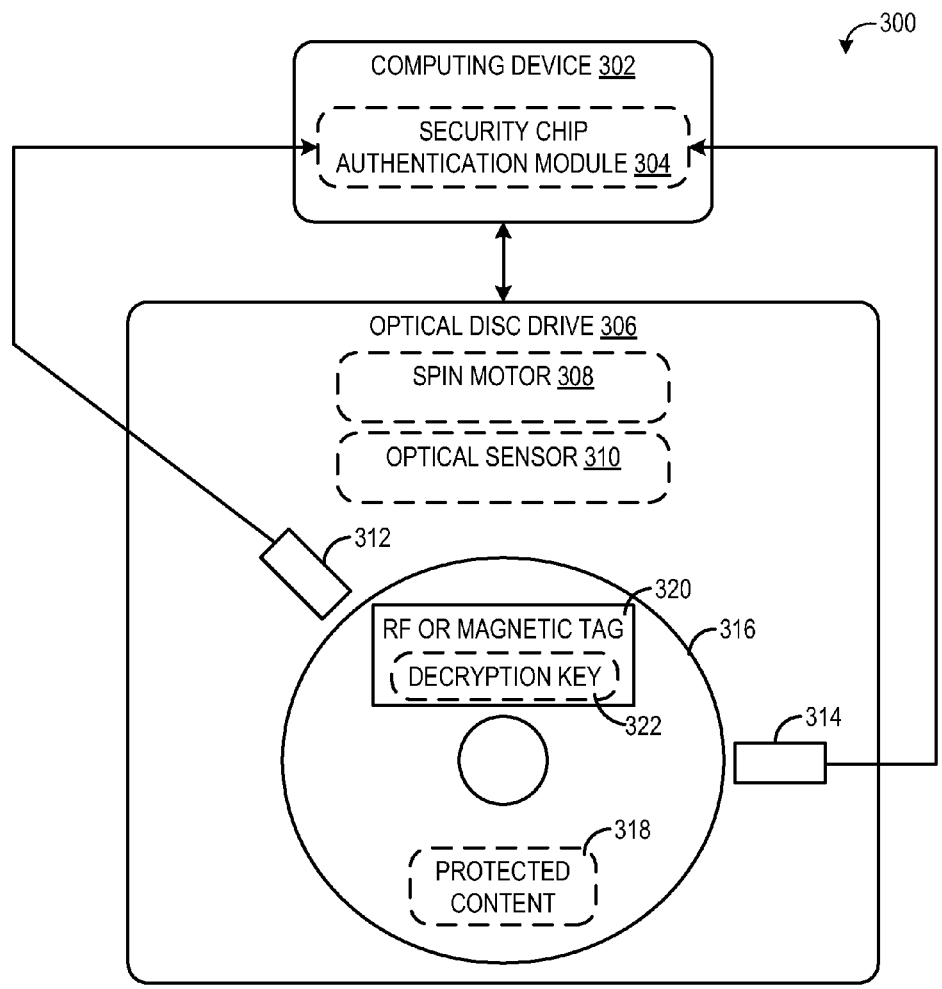
FIG. 3 shows a system for accessing protected content stored on an optical disc according to an embodiment of the present disclosure.

FIG. 3 shows a system 300 for accessing protected content stored on an optical disc. System 300 includes a computing device 302, such as computing device 102 of FIG. 1, that is configured to authenticate optical discs for playback. Accordingly, computing device 302 includes a security device authentication module 304 configured to receive disc authentication information from an optical disc drive 306. The optical disc drive 306 may be included in computing device 302, or optical disc drive 306 may be separate from but in communication with computing device 302. Optical disc drive 306 may include one or more optical sensors 310 to read optical discs, such as optical disc 316. Additionally, optical disc drive 306 includes a spin motor 308 to spin optical disc 316 in order to read the content written on optical disc 316 with the optical sensor 310.

Computing device 302 may be any suitable type of device, including but not limited to a desktop computer, laptop computer, tablet, mobile phone, or other computing device. In some embodiments, computing device 302 may be a standalone playback device configured to play optical discs, such as a CD player, DVD player, etc. Optical disc 316 may be any type of disc configured to store information that is optically readable, such as CD, DVD, HD-DVD, laser disc, etc.

As explained previously, optical disc 316 may include protected content 318. Protected content 318 may be any suitable content, including but not limited to audio files, video files, executables, etc. To access the protected content 318, the encrypted or inaccessible material may be accessed via a key 322 (e.g. a decryption key or other suitable key) included on a security device 320 or chip embedded in optical disc 316. The presence and validity of the key may be confirmed through identification of the security device 320, which may include a suitable identification tag, such as a radiofrequency (RF) ID tag, near field communication tag, or magnetic tag.

To identify the RF or magnetic tag, optical disc drive 306 may include one or more sensors. For example, rotation of an optical disc comprising an RFID tag may be detected via a frequency shift detected by an RF receiver, whereas rotation of a disc comprising a magnetic tag may be detected via two magnetic sensors spaced apart in a rotational path of the disc.

In the depicted embodiment, optical disc drive 306 includes two sensors, first sensor 312 and second sensor 314. First and second sensors 312, 314 may be RF sensors, magnetic sensors, and/or other types of sensors. Sensors 312 and 314 may provide output, such as voltage or current signals, to the security device authentication module 304. The security device authentication module 304 may utilize the sensor output to determine if the optical disc 316 includes an embedded security device, and if so, may use a key or other security feature on the device to access the protected content. In other embodiments, an optical disc drive may include either a greater or lesser number of sensors.

In one example, security device 320 includes an RFID tag and sensor 312 is an RF sensor. RF sensor 312 may detect the RF signal emitted from the RFID tag while the optical disc 316 is at rest. Then, spin motor 308 may be operated to spin the optical disc 316 at a first speed. As the RFID tag approaches the sensor 312, the frequency of the signal detected by the sensor 312 may increase above the signal detected when the optical disc is at rest. The signal may return to the at-rest signal when the RFID tag passes by the sensor 312, and then decrease as the tag recedes away from the sensor 312, due to the Doppler Effect of the radio signal emitted by the tag as it travels past the sensor. If the signal detected by sensor 312 remains the same as the at-rest signal, even as the optical disc is spun, the security device authentication module 304 may indicate that the optical disc does not include a valid security chip, and the protected content may remain inaccessible. On the other hand, if the signal detected by sensor 312 fluctuates synchronous with the spinning of the optical disc due to the Doppler Effect (e.g., increases as the chip approaches the sensor and decreases as the chip recedes away from the sensor), the security device authentication module 304 may confirm that the security device is valid and access the protected content.

In another example, security device 320 includes a magnetic tag that emits a magnetic field detectable by sensors 312 and 314, which are both magnetic sensors. When the optical disc 316 is at rest, each sensor 312, 314 may detect a respective at-rest magnetic field having a magnitude that may depend on the distance of the security chip from each sensor. When the optical disc spins, the magnetic field detected by each sensor may reach a peak signal as the magnetic tag passes by the sensor, and then reach a low signal when the magnetic tag is opposite the sensor. Based on the points in time at which each sensor detects a peak magnetic field, the speed of the security device may be calculated. If the speed of the device corresponds to the speed of the disc, the optical disc may be authenticated as including a valid security device, while if the speed of the device does not match the speed of the optical disc, the optical disc may be indicated as not including a valid security device.

Further, to prevent a spoofing device is from mimicking the signal modulation of a spinning valid security device, the security device authentication module 304 may be configured to send a signal to the spin motor 308 vary the speed of the spin motor so that the optical disc spins at different speeds. The frequency variation detected by the RF sensor and/or the magnetic field shift detected by the magnetic sensors would be expected to shift synchronously with the different disc spins speeds such that the security device authentication module 304 detects a corresponding synchronous shift in the detected electric and/or magnetic signal. If the security device authentication module 304 does not detect a shift in the frequency and/or spin speed of the security device, or if the frequency and/or device spin speed shift occurs with a time lag after the commanded change in spin motor speed, the security device authentication module 304 may indicate that the optical disc does not include a valid security device.

In still further embodiments, the information usable to access the protected content may be included in a location other than the embedded security device. For example, the information for accessing the protected content may be a code formed in a metallization layer of the optical disc that is readable by the optical sensor. In another example, rather than having access information (e.g., a decryption key) on the security device, the information for accessing the protected content may be stored in a remote database and obtained by the security device authentication module 304 after confirming the validity of the security device.

In some embodiments, an optical disc and a security device embedded in the optical disc may be configured to have a combined center of mass at a location selected to facilitate the proper spinning and reading of the disc. For example, in some embodiments, a disc may be configured to have a compensating mass opposite a location of a security device relative to a center of the optical disc. In other embodiments, a security device may have a multi-lobed or other non-rotationally symmetric configuration in which portions of the security device are placed at different locations on an optical disc to achieve a desired center of mass. It will be understood that these configurations for balancing an optical disc comprising a security device are presented for the purpose of example and are not intended to be limiting in any manner. Further, in some embodiments a security device may be sufficiently low in mass relative to an optical disc as to allow incorporation of the security device without use of a counterbalancing mechanism.

Figure 6:
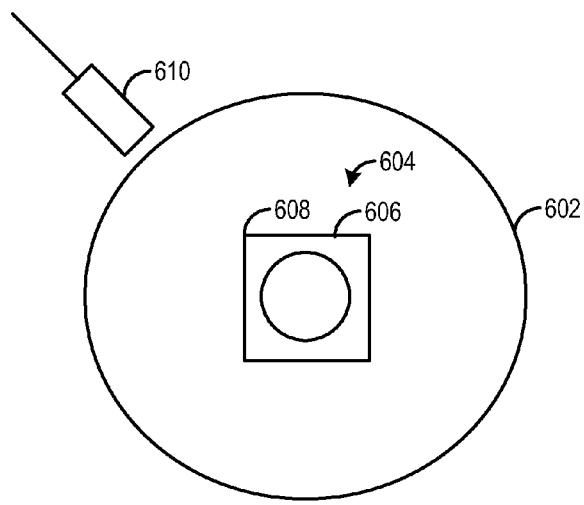
FIG. 6 illustrates an example non-rotationally symmetric security device according to an embodiment of the present disclosure.

FIG. 6 illustrates an example non-rotationally symmetric security device that maintains a center of mass of the optical disc. The optical disc 602 of FIG. 6 includes a transmitting antenna 604 (configured to transmit a radiofrequency signal, for example) shaped as a square. Accordingly, the transmitting antenna 604 includes a plurality of sides 606 and a plurality of corners 608. The signal emitted by transmitting antenna 604 may be received by receiving antenna 610. When the optical disc 602 rotates, the coupled field will vary depending on the alignment of the transmitting and receiving antennas, thus modulating the received signal. For example, the signal received by the receiving antenna 610 will be different when a corner 608 is aligned with the receiving antenna 610 than when a side 606 is aligned with the receiving antenna 610 (e.g., the corner of the transmitting antenna will be closer to the receiving antenna than the side of the transmitting antenna).

Further, the design of the antenna's asymmetry can be done such that modulating frequency can encode unique information. For example, as explained above, the transmitting antennal may be square. In another example, the receiving antenna may be square, include two overlapping squares, include three overlapping squares, etc.

If the receiving antenna is square, the modulation frequency is directly related to the rotational frequency in a 4:1 fashion, as the coupling peaks when the receiving antenna and transmitting antenna align at 0, 90, 180, and 270 degrees. As the antenna design incorporates other features that align, different frequencies may be obtained. Further, receiver/transmitter antennas may differ, so that different designs can interoperate, but produce different frequencies. (e.g., with a square transmitter antenna, different receiver antennas that have different alignment events will produce different frequencies).

Figure 4:
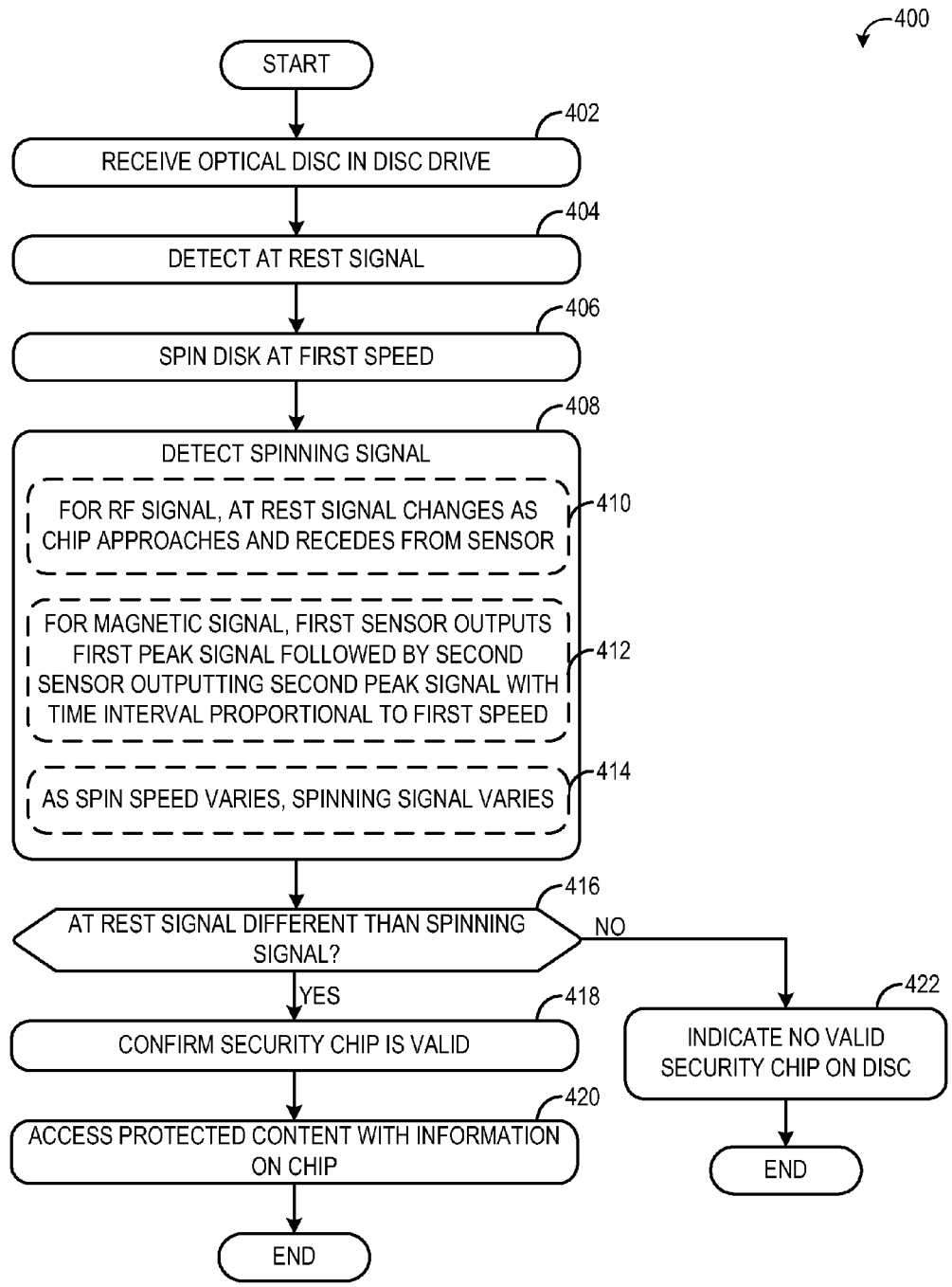
FIG. 4 is a flow chart illustrating a method for validating an optical disc according to an embodiment of the present disclosure.

FIG. 4 shows a method 400 for validating an optical disc. Method 400 may be performed by a computing or other playback device, such as computing device 302 of FIG. 3. At 402, method 400 includes receiving an optical disc in an optical disc drive. The optical disc drive may be included in the computing or playback device, or may be located separately from, but in communication with, the computing or playback device. At 404, one or more sensors of the optical disc drive are used to detect a signal while the optical disc is at rest. The one or more sensors may include radiofrequency or magnetic sensors. The sensors may send an output, such as voltage or current, indicative of an RF or magnetic signal detected by the sensors to the computing device.

At 406, the optical disc is spun at a first speed. The computing device may command the spin motor of the optical disc drive to spin at the first speed, or the first speed may be a default speed the spin motor automatically operates at when a disc is received at the disc drive. At 408, method 400 includes detecting a spinning signal emitted while the optical disc is spinning at the first speed. The detected spinning signal may be different than the detected at-rest signal if the signal is emitted from a tag of a security device or chip embedded in the optical disc. For example, as indicated at 410, for an RF signal emitted by an RFID tag, the at-rest radiofrequency detected by the RF sensor changes as the RFID tag approaches and recedes from the RF sensor. In another example, as indicated at 412, for a magnetic field emitted from a magnetic tag embedded in the optical disc detected by two magnetic sensors, the first sensor may outputs a first peak signal followed by the second sensor outputting a second peak signal, with a time interval between the peak signals proportional to (e.g., equal to) the first speed. Additionally, in some embodiments, the spinning speed of the optical disc may be varied, and the detected spinning signal will also vary if the detected signal is emitted from the optical disc, as indicated at 414.

At 416, it is determined whether the at-rest signal is different than the spinning signal. As explained above, the sensors may detect one or more of an electrical and magnetic effect on the signal resulting from the spinning of the optical disc. The optical disc may be validated if the one or more of the electrical and magnetic effect meets a predetermined condition, such as an increase in the detected signal frequency as the RFID tag approaches the RF sensor. If the spinning signal is different than the at-rest signal, it is determined that the detected signal is being emitted from a valid security device embedded in the optical disc, and the security device is validated at 418. Upon validating the security device, the protected content on the optical disc is accessed at 420 using information received from the security device, metallization layer of the disc, from a remote database, or other location. Accessing the content may include decrypting encrypted content using a decryption key. The optical disc drive may then read the content stored on the optical disc with one or more optical sensors. If the spinning signal is not different than the at-rest signal, method 400 proceeds to 422 to indicate that no valid security device is embedded on the optical disc. As such, the protected content remains inaccessible.

Thus, validating an optical disc storing protected content may include receiving the optical disc in an optical disc drive, detecting with a signal detector a signal while the optical disc is at rest, spinning the optical disc, determining, with the signal detector, one or more of an electrical and magnetic effect on the signal resulting from the spinning of the optical disc, and validating the optical disc if the one or more of the electrical and magnetic effect meets a predetermined condition.

In one example, detecting with the signal detector the signal when the optical disc is at rest comprises detecting with a radio frequency detector a base radio frequency when the optical disc is at rest. The one or more of the electrical and magnetic effect on the signal resulting from the spinning of the disc may include a shift in the base radio frequency that is synchronous with the spinning of the optical disc. The optical disc may be validated if the shift in the base frequency is detected. It may be determined that a valid security device is not embedded on the optical disc if the base radio frequency detected by the radio frequency detector does not shift synchronously with the spinning.

In another example, detecting with the signal detector the signal when the optical disc is at rest comprises detecting with a first magnetic sensor and a second magnetic sensor a magnetic field emitted by the security device when the optical disc is at rest. The one or more of the electrical and magnetic effect on the signal resulting from the spinning of the disc may include the magnetic field spinning with the optical disc based on the first magnetic sensor outputting a first peak signal at a first point in time followed by the second magnetic sensor outputting the a second peak signal at a second, different point in time. A rotation speed of the magnetic field may be based on an elapsed amount of time between the first point in time and the second point in time and a known distance between the first magnetic sensor and the second magnetic sensor. The rotation speed of the magnetic field may be compared to a predetermined rotation speed of the optical disc.

The security device may be indicated as being a valid security device embedded in the optical disc if the rotation speed of the magnetic field matches the rotation speed of the optical disc. The optical disc may be identified as not including a valid security device embedded on the optical disc if the rotation speed of the magnetic field differs from the rotation speed of the optical disc by more than a threshold speed (e.g., if it differs by more than 5%, as a non-limiting example).

Responsive to validating the optical disc, the protected content on the disc may be accessed with information associated with the security device embedded in the optical disc. In a different example, the optical disc may be confirmed as an authorized optical disc by optically reading a code formed in a metallization layer of the optical disc. After validating the disc, the optical disc may be read with an optical sensor, wherein the optical sensor is different than the signal detector.

Another example method for accessing protected content on an optical disc having an embedded security device includes detecting with a radio frequency detector a base radio frequency emitted when the optical disc is at rest, spinning the optical disc, detecting with the radio frequency detector a spinning radio frequency emitted by the security device when the optical disc is spinning, and if the spinning radio frequency deviates from the base radio frequency during at least a portion of a revolution of the optical disc, identifying the security device as a valid security device.

Identifying the security device as a valid security device further comprises one or more of, if the spinning radio frequency increases as the security device approaches the radio frequency detector, identifying the security device as a valid security device, and if the spinning radio frequency decreases as the security device recedes from the radio frequency detector, identifying the security device as a valid security device. The protected content may be accessed using information associated with the security device responsive to identifying that the security device is valid.

If the spinning radio frequency remains constant throughout at least an entire revolution of the optical disc, the method may include identifying that a valid security device is not embedded on the optical disc. Additionally, the method may further comprise confirming that the optical disc is an authorized optical disc by optically reading a code formed in a metallization layer of the optical disc.

In a still further embodiment, accessing protected content on an optical disc may include receiving a first signal from a first magnetic sensor indicative of a magnetic field emitted by a security device embedded in an optical disc, receiving a second signal from a second magnetic sensor indicative of the magnetic field emitted by a security device, the second magnetic sensor being at a different location than the first magnetic sensor, spinning the optical disc at a first speed, determining if the security device is spinning at the first speed based on a difference between when the first signal reaches a first peak signal and when the second signal reaches a second peak signal and further based on a distance between the first and second magnetic sensors, and if the security device is spinning at the first speed, indicate the security device is valid.

In some examples, a speed of spinning of the optical disc may be varied, and the method may determine whether a change in time between the first peak signal and the second peak signal corresponds to a change in spinning speed. The protected content on the optical disc may be accessed using information associated with the security device responsive to identifying that the security device is valid. Additionally, the method may confirm that the optical disc is an authorized optical disc by optically reading a code formed in a metallization layer of the optical disc.

In some embodiments, the methods and processes described herein, such as the methods for accessing protected content described above, may be tied to a computing system of one or more computing devices. In particular, such methods and processes may be implemented as a computer-application program or service, an application-programming interface (API), a library, and/or other computer-program product.

Figure 5:
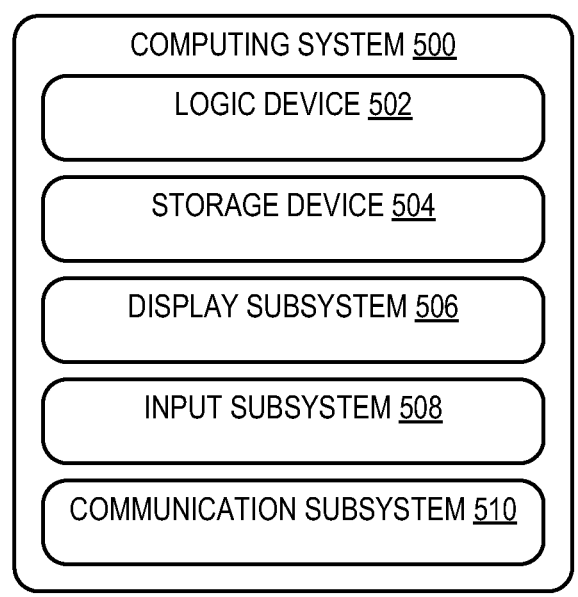
FIG. 5 is a block diagram of an example embodiment of a computing system.

FIG. 5 schematically shows a non-limiting embodiment of a computing system 500 that can enact one or more of the methods and processes described above. Computing device 102 and/or computing device 302 are non-limiting examples of computing system 500. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic device 502 and a storage device 504. Computing system 500 may optionally include a display subsystem 506, input subsystem 508, communication subsystem 510, and/or other components not shown in FIG. 5.

Logic device 502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage device 504 includes one or more physical devices configured to hold instructions executable by the logic machine to implement the methods and processes described herein. When such methods and processes are implemented, the state of storage device 504 may be transformed—e.g., to hold different data.

Storage device 504 may include removable and/or built-in devices. Storage device 504 may include optical memory (e.g., CD, DVD, HD-DVD, Blu-Ray Disc, etc.) readable by a drive, such as optical disc drive 306, semiconductor memory (e.g., RAM, EPROM, EEPROM, etc.), and/or magnetic memory (e.g., hard-disk drive, floppy-disk drive, tape drive, MRAM, etc.), among others. Storage device 504 may include volatile, nonvolatile, dynamic, static, read/write, read-only, random-access, sequential-access, location-addressable, file-addressable, and/or content-addressable devices.

It will be appreciated that storage device 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic device 502 and storage device 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "module" may be used to describe an aspect of computing system 500 implemented to perform a particular function. In some cases, a module may be instantiated via logic device 502 executing instructions held by storage device 504. It will be understood that different modules may be instantiated from the same application, service, code block, object, library, routine, API, function, etc. Likewise, the same module may be instantiated by different applications, services, code blocks, objects, routines, APIs, functions, etc. The term "module" may encompass individual or groups of executable files, data files, libraries, drivers, scripts, database records, etc.

When included, display subsystem 506 may be used to present a visual representation of data held by storage device 504. This visual representation may take the form of a graphical user interface (GUI). As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic device 502 and/or storage device 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for validating an optical disc storing protected content, the method comprising:
   receiving the optical disc in an optical disc drive;
   detecting with a signal detector a signal while the optical disc is at rest;
   spinning the optical disc;
   determining, with the signal detector, whether the signal changes as a result of the spinning of the optical disc; and
   validating the optical disc when the signal changes as a result of the spinning of the optical disc.

2. The method of claim 1, wherein detecting with the signal detector the signal when the optical disc is at rest comprises detecting with a radio frequency detector a base radio frequency when the optical disc is at rest.

3. The method of claim 2, wherein validating the optical disc comprises detecting a shift in the base radio frequency that is synchronous with the spinning when the optical disc is spinning.

4. The method of claim 3, further comprising determining that a valid security device is not embedded on the optical disc if the base radio frequency detected by the radio frequency detector does not shift synchronously with the spinning.

5. The method of claim 1, wherein detecting with the signal detector the signal when the optical disc is at rest comprises detecting with a first magnetic sensor and a second magnetic sensor a magnetic field emitted when the optical disc is at rest.

6. The method of claim 5, wherein validating the optical disc comprises detecting whether the magnetic field is spinning with the optical disc based on the first magnetic sensor outputting a first peak signal at a first point in time followed by the second magnetic sensor outputting a second peak signal at a second, different point in time.

7. The method of claim 6, further comprising determining a rotation speed of the magnetic field based on an elapsed amount of time between the first point in time and the second point in time and a known distance between the first magnetic sensor and the second magnetic sensor, and comparing the rotation speed of the magnetic field to a predetermined rotation speed of the optical disc.

8. The method of claim 7, further comprising indicating that a valid security device embedded in the optical disc is spinning with the optical disc if the rotation speed of the magnetic field matches the rotation speed of the optical disc, and identifying that the valid security device is not embedded on the optical disc if the rotation speed of the magnetic field differs from the rotation speed of the optical disc by more than a threshold speed.

9. The method of claim 1, further comprising reading the optical disc with an optical sensor, wherein the optical sensor is different than the signal detector.

10. The method of claim 1, further comprising, responsive to validating the optical disc, accessing the protected content with information associated with a security device embedded in the optical disc.

11. The method of claim 1, further comprising confirming that the optical disc is an authorized optical disc by optically reading a code formed in a metallization layer of the optical disc.

12. On a computing device, a method for accessing protected content on an optical disc having an embedded security device, the method comprising:
    detecting with a radio frequency detector a base radio frequency emitted when the optical disc is at rest;
    spinning the optical disc;
    detecting with the radio frequency detector a spinning radio frequency emitted when the optical disc is spinning; and
    when the spinning radio frequency increases as the security device approaches the radio frequency detector and decreases as the security device recedes from the radio frequency detector identifying the security device as a valid security device.

13. The method of claim 12, further comprising accessing the protected content using information associated with the security device responsive to identifying that the security device is valid.

14. The method of claim 12, further comprising if the spinning radio frequency remains constant throughout at least an entire revolution of the optical disc, identifying that the valid security device is not embedded on the optical disc.

15. The method of claim 12, further comprising confirming that the optical disc is an authorized optical disc by optically reading a code formed in a metallization layer of the optical disc.

16. A computing device, comprising:
    a logic device; and
    a storage device holding instructions executable by the logic device to:
        receive a first signal from a first magnetic sensor indicative of a magnetic field emitted by a security device embedded in an optical disc;
        receive a second signal from a second magnetic sensor indicative of the magnetic field emitted by the security device, the second magnetic sensor being at a different location than the first magnetic sensor;
        spin the optical disc at a first speed;
        determine if the security device is spinning at the first speed based on a difference between when the first signal reaches a first peak signal and when the second signal reaches a second peak signal and further based on a distance between the first and second magnetic sensors; and
    if the security device is spinning at the first speed, indicate the security device is valid.

17. The computing device of claim 16, wherein the instructions are further executable to vary a speed of spinning and determine whether a change in time between the first peak signal and the second peak signal corresponds to a change in the spinning speed.

18. The computing device of claim 16, wherein the instructions are executable to access protected content on the optical disc using information associated with the security device responsive to identifying that the security device is valid.

19. The computing device of claim 18, wherein the instructions are executable to confirm that the optical disc is an authorized optical disc by optically reading a code formed in a metallization layer of the optical disc.

* * * * *